United States Patent [19]

Sandercock

[11] Patent Number: 4,615,504

[45] Date of Patent: Oct. 7, 1986

[54] ANTI-VIBRATION DEVICE

[75] Inventor: John R. Sandercock, Affoltern a/A, Switzerland

[73] Assignee: RCA Corporation, Princeton, N.J.

[21] Appl. No.: 671,900

[22] Filed: Nov. 15, 1984

[51] Int. Cl.⁴ ............................................. F16F 15/00
[52] U.S. Cl. ..................................... 248/550; 248/638; 248/636
[58] Field of Search ............... 248/550, 636, 638, 559, 248/560, 556, 603, 618, 562; 267/140.1, 141

[56] References Cited

U.S. PATENT DOCUMENTS

| | | | |
|---|---|---|---|
| 2,964,272 | 12/1960 | Olson | 248/550 |
| 3,464,657 | 9/1969 | Bullard | 248/20 |
| 3,606,233 | 9/1971 | Scharton | 248/550 |
| 3,701,499 | 10/1972 | Schubert | 248/550 |
| 3,703,999 | 11/1972 | Forys | 248/550 |
| 3,952,979 | 4/1976 | Hansen | 248/20 |
| 4,033,541 | 7/1977 | Malueg | 248/358 |
| 4,101,102 | 7/1978 | Lloyd | 248/638 |
| 4,336,917 | 6/1982 | Phillips | 248/550 |
| 4,363,377 | 12/1982 | Van Gerpen | 248/550 |

FOREIGN PATENT DOCUMENTS 581345 11/1977 U.S.S.R. ............................... 248/550

OTHER PUBLICATIONS

Abstract of Patent Specification for United Kingdom Patent Application 2,126,759, published on Mar. 28, 1984.

Primary Examiner—Reinaldo P. Machado
Assistant Examiner—Alvin Chin-Shue
Attorney, Agent, or Firm—Joseph S. Tripoli

[57] ABSTRACT

Machines and work surfaces may be isolated from vibration effects by coupling them to a vibration damping device. A bracket is connected to the object to be isolated. An accelerometer which supports a mass is coupled to the bracket and senses the acceleration of the mass. An electromechanical transducer is connected between the bracket and the floor on which the object rests. The transducer responds to the sensed acceleration of the mass to generate forces to counter the acceleration.

13 Claims, 6 Drawing Figures

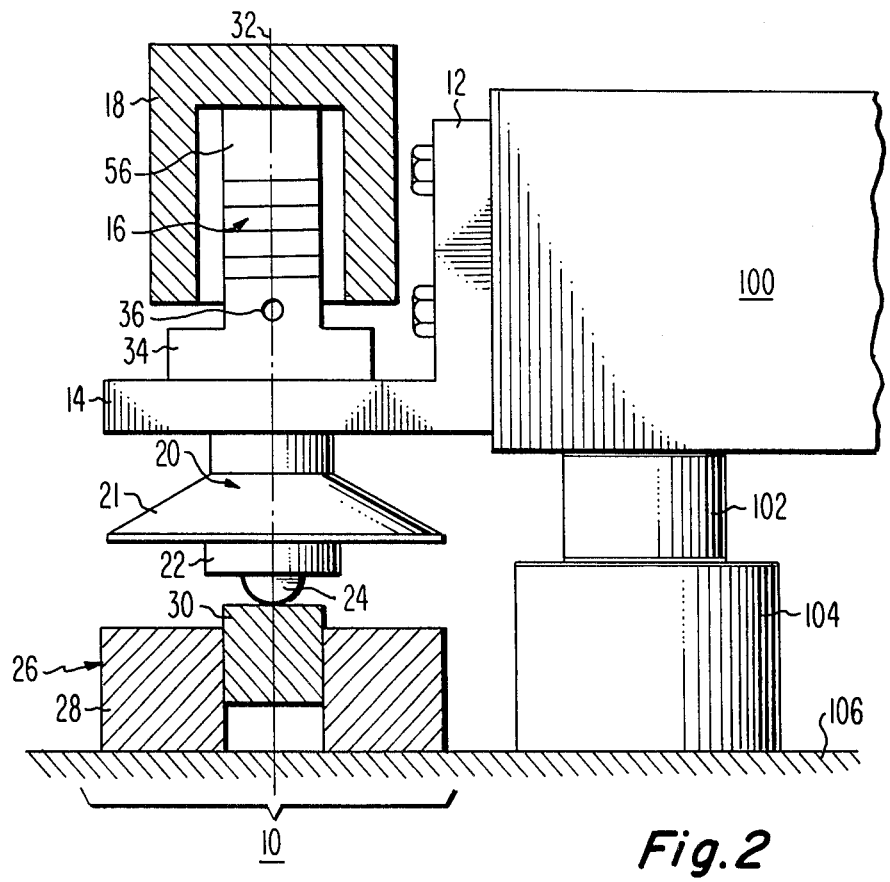
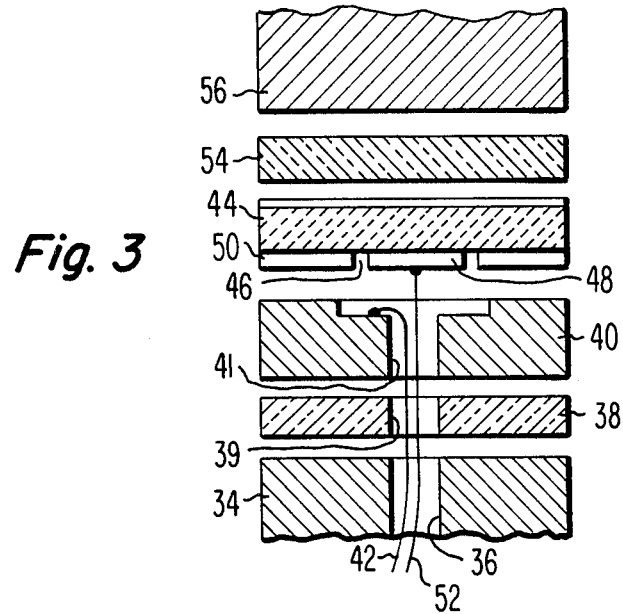
Fig. 2
Fig. 3

ANTI-VIBRATION DEVICE

The present invention relates to devices for reducing or canceling the effects of vibrations on an object.

BACKGROUND OF THE INVENTION

Certain delicate machines and scientific instruments can be rather sensitive to external vibrations. Generally there are two distinct effects—(1) high frequency vibrations which tend to excite a mechanical resonance in some part of the machine or its supports and (2) low frequency vibrations which tend to produce a non-resonant distortion of the machine's basic structure. Normally the former effect, at frequencies typically in the range of 100–1,000 Hz, can be effectively eliminated by the simple expedient of mounting the system on thin rubber pads. The latter effect, typically driven by building vibrations in the frequency range of 2–25 Hz, is much harder to eliminate and some sophisticated passive antivibration mounts have been developed for this purpose. It is these low frequency vibrations to which the present invention is directed.

The simplest method of vibration isolation consists of mounting the device to be isolated (or its platform) on a spring having a force constant $\lambda$. To increase the energy absorption of a passive system, damping and compound spring devices have been employed. Although such passive systems can accomplish a great deal, some displacement of the device or platform results.

Consider the case of a passive mount consisting of a mass M supported on a spring of force constant $\lambda$, as illustrated in FIG. 1(a). Of interest is the vertical movement $y_1$ of the mass M in response to a movement $y_2$ of the supporting surface. If $y_2$ is a harmonic displacement with angular frequency $\omega$ and amplitude $a_2$, then the response $y_1$ is also harmonic with amplitude $a_1$ such that $y_1 = a_1 e^{i\omega t}$ where i is the square root of $-1$. From this it is straightforward to show that:

$$\frac{a_1}{a_2} = \frac{1}{1 - \left(\frac{M\omega^2}{\lambda}\right)} \quad (1)$$

At high frequencies the second term in the denominator is large and $a_1$ therefore small, i.e. high frequency isolation is good. However, at a frequency $\omega_o$ given by $$M\omega_o^2/\lambda = 1$$

the amplitude $a_1$ becomes infinite, and some damping must clearly be introduced in a practical device.

In the damped system of FIG. 1(b) having a damping factor $\Gamma$, there is a viscous force F acting with amplitude $F = \Gamma\lambda \cdot (d/dt)(y_1 - y_2)$. The response of the damped system is:

$$\frac{a_1}{a_2} = \frac{1 + i\Gamma\omega}{\left(1 - \frac{\omega^2}{\omega_o^2}\right) + i\Gamma\omega} \quad (2)$$

The amplitude $a_1$ is now complex (i.e. phase shifted) but the amplitude at resonance is reduced to:

$$\left|\frac{a_1}{a_2}\right|_{\omega = \omega_o} = \left(1 + \frac{1}{\Gamma^2\omega_o^2}\right)^{\frac{1}{2}} \quad (3)$$

In practice the choice of damping factor $\Gamma$ is a compromise between low resonant amplitude (equation 3) and sufficient high frequency isolation. Equation 2 shows that for the high values of $\Gamma$ needed for low resonant amplitude, the amplitude $a_1/a_2$ tends toward unity, i.e. no attenuation of the vibration amplitude. While more complex spring systems can offer better high frequency isolation, the problem of amplitude build up at resonance remains.

To overcome some of the shortcomings of a passive system various dynamic antivibration systems have been developed. Generically these systems detect the vibration and produce counter forces to cancel the forces driving the vibration. Such dynamic systems have been used to eliminate particular structural resonances (i.e. relatively high frequencies—the resonant condition referred to above). In such systems the correction forces have been derived using electric solenoids or compressed gas transducers.

SUMMARY OF THE INVENTION

A dynamic system for reducing the vibration of an object has an accelerometer coupled to the object. The accelerometer supports a mass so as to detect the acceleration of the mass which is produced by forces acting on the object. An output signal corresponding to the acceleration is generated by the accelerometer. Force generating means is coupled to the object to produce forces in response to the detected acceleration of the mass to counter the forces acting on the object.

BRIEF DESCRIPTION OF THE DRAWINGS

FIG. 2 is a partially sectional side view of one device according to the present invention;

FIG. 3 is an exploded view of an accelerometer in the device of FIG. 1;

DETAILED DESCRIPTION OF THE PREFERRED EMBODIMENT

Figure 1A:
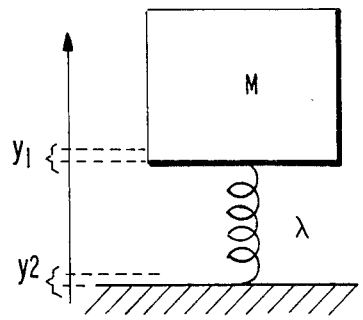
FIGS. 1(a) and 1(b) are schematic representations of prior art passive antivibration systems.
Figure 1B:
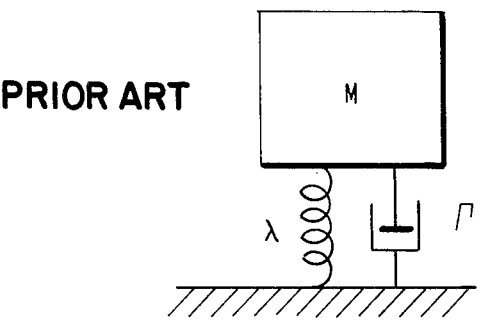

With reference to FIG. 2, an object 100, such as a tabletop or scientific instrument to be isolated from the effects of vibration, is supported by a rubber block 102. The rubber block 102 is supported by a metal stand 104 which in turn rests on a reference surface 106 such as the floor of the room in which object 100 is located.

A dynamic antivibration device 10 is coupled to object 100 to counter the effects of vibration of the object. Specifically, a bracket 12 is fastened to the object by bolts or other means. Alternatively, the bracket 12 may be an integral part of the object. Although the bracket 12 may take any of several forms, it is shown in FIG. 2 as being generally L shaped having a foot portion 14 extending from the object 100. Positioned on the upper surface of the foot portion 14 is an accelerometer 16 which in turn supports a mass 18, for example a 1 Kg.

bell-shaped piece of metal. The accelerometer produces an electrical output signal representing the acceleration of mass 18. This signal is applied to a feedback loop to control an electromechanical transducer, as will be described in detail.

With reference to FIG. 3, the accelerometer 16 consists of the lower support block 34 on the bracket leg 14 and having an aperture 36 extending therethrough from a central location in the upper surface of the support block to one of the sides (FIG. 2). On top of the support block 34 is a first piece of thermally insulative material 38, such as glass. The insulative material 38 has an aperture 39 extending therethrough aligned with the aperture 36 in the upper surface of the support block 34. On top of the insulator material 38 is a steel thrust block 40 also having an aperture 41 extending therethrough aligned with the apertures in the first insulator 38 and the support block 34. Extending through these apertures is a first wire 42 having one end electrically connected to the thrust block 40.

A piezoelectric transducer 44 sits on top of the thrust block 40. The transducer 44 is a silver coated piezoelectric disc which is axially polarized. The lowest mechanical resonance of the antivibration device 10 must exceed 10 KHz so that adequate gain may be applied in the feedback loop. To achieve this the piezoelectric material 44 must be used in the compressional mode as bending modes (bimorph devices) are too soft. The silver coated bottom surface of the disc 44 which contacts the thrust block 40 has an annulus 46 of the silver removed so as to form a center disc shaped portion of the silver 48 surrounded by a ring shaped portion 50. The annulus 46 is located so that the central portion of the silver coating 48 is over aperture 41 and is not in electrical contact with the thrust block 40. A second wire 52 has one end connected to the central silver coating 48. The ring shaped silver coating portion 50 is in electrical contact with the thrust block 40. The other major surface of the piezoelectric transducer 44 is in contact with a second piece of thermal insulating material 54, similar to piece 38 but without an aperture. An upper support block 56 rests on the other surface of the glass block 54. As seen in FIG. 2, the mass 18 rests on the upper support block 56 with the components of the accelerometer 16 and the mass 18 centrally positioned about axis 32.

Because typical piezoelectric material is also pyroelectric, the insulating materials 38 and 54 provide thermal isolation of the piezoelectric transducer 44 to reduce spurious voltages which may be generated by temperature fluctuations in the piezoelectric material. However, in addition the device is temperature compensated. Any temperature changes in the device ambient will produce equal and opposite charges at the two major surfaces of the piezoelectric disc 44 but equal charges on the areas 48 and 50 thereby producing no net change in the output signal.

Returning to FIG. 2, an electromechanical transducer 20 is connected to the lower surface of the leg portion 14 for inducing forces against the bracket 12 in response to an applied electrical signal from the accelerometer 16. For example, one type of the electrical transducer is a loudspeaker fastened to the under side of the leg portion 14 with the cone 21 pointing downward. However, other types of transducers such as a solenoid or a pneumatic cylinder may be employed. The transducer 20 is supported from below by a block 22, which in the case of a loudspeaker, is glued to the center of the cone in intimate contact with the voice coil of the loudspeaker. The surface of the block 22 remote from the loudspeaker has the flat surface of a hemisphere 24, formed of a magnetic material, attached to it. The curved surface of the hemisphere makes contact with a support structure 26 comprised of a ring 28 on the reference surface 106 and a magnet 30 positioned within the ring. The magnet 30 is frictionally coupled to the ring 28 in a manner as will be described in more detail and is in magnetic contact with the hemisphere 24. The various elements of the antivibration device 10 are centrally positioned on an axis 32 passing through the point of contact between the hemisphere 24 and the magnet 30. In the particular orientation of the device 10 in FIG. 2, the axis 32 extends in the vertical direction, perpendicular to the reference surface 106.

Figure 4:
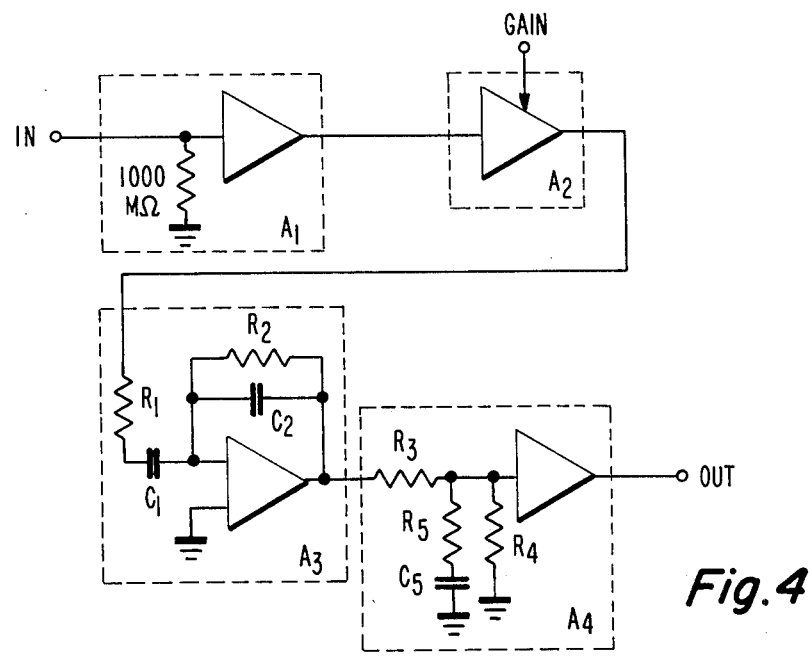
FIG. 4 is a schematic diagram of electronic circuitry used to control the device of the present invention.

The output signal from the accelerometer 16 responsive to vibrations of mass 18, is processed by electric circuitry similar to that shown in FIG. 4 before being fed back to the electromechanical transducer 20 as a correction signal. The basic processing consists of integration, with some low and high frequency attenuation. The wires 42 and 52 from the accelerometer 16 are connected to the input terminal (IN) of the circuit and to ground. As the piezoelectric element 44 is pure capacitance (C), the circuit must provide a parallel resistance (R) to define the DC conditions. The lowest frequency 1/RC to which the element will respond must be chosen to be lower than the lowest frequency component of the vibrations to be compensated. The resistance R causes a mean square noise voltage, $\overline{\Delta V^2} = 4kTR (\Delta f)$ where:

$$\Delta f \sim 1/RC \text{ and } \overline{\Delta V^2} \sim 4kT/C$$

For typical values of $C \sim 1$ nF, the noise voltages are on the order of about 4 $\mu$V. The mass 18 must be chosen large enough so that the smallest accelerations to be measured given signals larger than this limiting noise value.

Accordingly, a preamplifier A1 has a 1000 Megohm input impedance connected to the piezoelectric transducer 44. A variable gain transconductance operational amplifier A2 has its input coupled to the output of the preamplifier A1 and its output connected to integrator A3. The signal at the input of the integrator is filtered by $R_1$ and $C_1$ which pass only signals with a frequency higher than a predetermined limit, typically one hertz. The integration time constant $C_2R_2$ should be approximately unity or greater.

The output of the integrator A3 is coupled to the input of an output amplifier A4 through a series connected resistor R3. The input of the amplifier A4 is connected to ground through resistor R4 and through the series connection of capacitor C5 and resistor R5. The resistors R3, R4, R5 and capacitor C5 form a divider chain which provides high frequency attenuation above a frequency around 200 Hz that allows a higher gain to be used in the feedback loop before the onset of high frequency oscillation. The output of the amplifier A4 is coupled to the transducer 20.

The output stage A4 is a switch mode amplifier giving a very high power conversion efficiency. This stage can deliver up to thirty watts but under normal conditions (in a laboratory environment with a maximum acceleration on the object of about 10 cm/sec$^2$ at 20 Hz) the power required is well under one watt. Full power is normally only required for isolating against forces supplied directly to the supported object 100 (e.g. hand contact). Because of the large difference between the mean power and maximum power, it is convenient to use rechargeable batteries as the power source for the device 10 and a trickle charger providing sufficient power to cover the mean consumption.

There are two very important and fundamental differences between dynamic and passive vibration isolation systems. From equation (2) it is seen (as discussed above) that $\Gamma$ may not be too large if isolation is to be effective for the passive system. On the other hand equation (4) shows that for the dynamic system the damping term may be arbitrarily large (large $k_1$) with the isolation improving with increased damping. This distinction arises because for the passive case damping is proportional to the relative velocity between the mass and the reference surface 106, while for the dynamic case the damping is proportional to the absolute velocity. An absolute velocity may be thought of as a velocity relative to a virtual inertial plane—thus high damping in the dynamic system is equivalent to strong coupling to an inertial reference plane and therefore the better the isolation the stronger the coupling.

Arising out of this distinction it is clear that the passively supported mass floats on its support, while the dynamically supported mass is essentially rigidly held. This difference will make itself apparent when external forces are applied directly to the supported mass (for example by hand contact, electrical leads, pumping lines etc.). For the passive system a force $F=F_o e^{iwt}$ applied to the mass at a frequency $\omega>>\omega_o$ produces an acceleration $d^2y_1/dt^2=F/M$, unattenuated by the support system. For the dynamic system a force applied directly to the supported mass is in all ways equivalent to a force entering via the support system and will therefore be compensated.

Since the mass 18 (m) is supported by the piezoelectric transducer 44, the voltage V developed across the transducer is proportional to the absolute acceleration $(d^2y_1/dt^2)$ of the mass. This voltage is integrated to produce a current $I \sim \int V dt$ which produces a force $k_2 I$ in the electromechanical transducer 20, where $k_2$ is a constant. The equation describing the motion of the device 10 is therefore:

$$m = \frac{d^2y_1}{dt^2} = -\lambda(y_1 - y_2) + k_2 I$$

$$\text{where } I \sim \int V dt \sim \int m \frac{d^2y_1}{dt^2} dt = \frac{k_1}{k_2} \cdot m \frac{dy_1}{dt}$$

where $k_1$ is a constant determined by the gain of the integrator. Therefore, $$m \frac{d^2y_1}{dt^2} = -\lambda(y_1 - y_2) + k_1 m \frac{dy_1}{dt}$$

from which it is straightforward to show that the amplitude $a_1$ of the response to a driving amplitude $y_2 = a_2 e^{iwt}$ is:

$$a_1/a_2 = \frac{\lambda}{(\lambda - m\omega^2) - ik_1 m\omega} \quad (4)$$

The amplitude $a_1$ therefore decreases with increasing values of $k_1$ (gain).

With the design of the device as shown in FIG. 2, the output of the circuit in FIG. 4 produces forces in the electromechanical transducer 20 which are opposed to the vibrational forces in the mass 18 and hence those of the object 100. The force provided by the transducer 20 and the component of the acceleration of the mass 18 measured by the accelerometer 16 both lie along the common axis 32. As the force must act between the support surface 106 and the bracket 12, it is necessary that the end of the transducer remote from the bracket 12 be coupled to the surface 106 in such a manner that the coupling is rigid in the direction of the common axis 32 and compliant perpendicular to this direction. The hemisphere 24 provides such transverse compliance. During a transverse displacement of the support block 22, the hemisphere 24 will tend to rock on the magnet 30 causing a rotation of a loudspeaker voice coil. During an excessive transverse displacement, the hemisphere 24 may slide on the magnet 30 thus preventing damage to the loudspeaker 20.

The magnet itself may be rigidly attached to the floor or as shown in FIG. 2 may be held in a friction coupling which allows it to slide along the common axis 32 whenever a certain magnitude of force is exceeded, thereby preventing damage to the device from excessive forces applied to the object. Clearly, this frictional force between the magnet 30 and the support ring 28 must be less than the magnetic coupling force between the hemisphere 24 and the magnet 30 but must be greater than the maximum force generated by the transducer 20. The combination of the hemisphere 24, the magnet 30 and the support ring 28 forms a completely self-aligning coupling between the reference surface 106 and the transducer 20.

Figure 5:
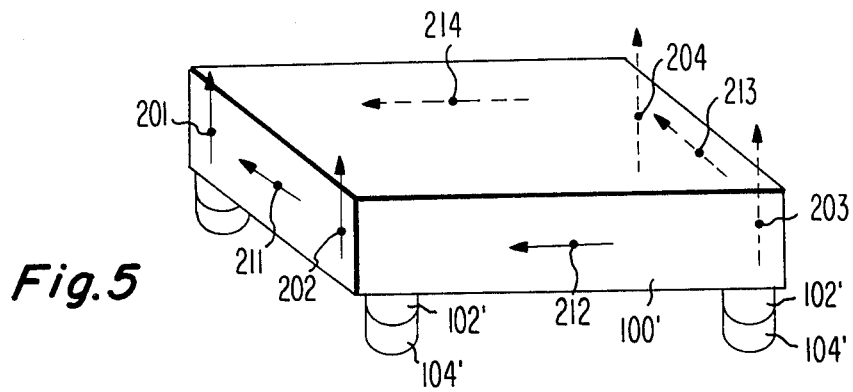
FIG. 5 is a prospective view of a plurality of devices shown in FIG. 1 connected to form a system providing vibration reduction in six degrees of freedom.

The device 10 in FIG. 2 provides damping of forces only along the axis 32. In a three dimensional structure 100' such as shown in FIG. 5, there may be six degrees of motion (three translational and three rotational degrees of freedom). Therefore, a minimum of six antivibration devices 10 are required for vibration isolation but more may be used to increase the correction forces available.

A convenient arrangement shown in FIG. 5 involves eight devices. The object 100', such as a tabletop, is supported at its four corners by rubber and steel support columns 102' and 104', respectively. On one side surface, two antivibration devices 10 are mounted at points 201 and 202 in a manner similar to that shown in FIG. 2 to provide vertical isolation as represented by the arrows passing through those points. On the opposite side of the object 100', two more devices 10 are vertically mounted at points 203 and 204. In the center of four side surfaces, at points 211-214, four additional antivibration devices 10 are mounted to provide horizontal vibration isolation, as shown by the horizontal arrows. It is apparent that for the horizontally acting devices the bracket 12 and the other elements of the device are rotated 90 degrees from the orientation shown in FIG. 2. For the horizontal devices the friction coupling holding the magnet 30 must be appropriately altered as must the support for ring 28 on surface 106.

With the eight devices connected to the object 100' any translational or rotational vibration forces will be detected in the respective accelerometers so that the proper counterforces may be produced in the corresponding transducers.

I claim:

1. A dynamic antivibration device for reducing the vibration of an object with respect to a reference surface, said device comprising:
   a bracket attached to the object;
   an accelerometer coupled to the bracket;
   a mass supported by the accelerometer such that the accelerometer detects the acceleration of the mass along an axis, said accelerometer producing an output signal corresponding to the acceleration; and
   means coupled between the bracket and the reference surface for generating forces to counter the detected acceleration of the mass, said means comprising an electromechanical transducer for generating counter forces in response to the output of the accelerometer and means for isolating the forces generated by the electromechanical transducer to only the force component along said axis.

2. The device as in claim 1 wherein the means for isolating forces comprises:
   a block having a hemispherical surface, said block abutting the transducer with the hemispherical surface remote from the transducer; and
   a support structure on the reference surface and in contact with the hemispherical surface of said block.

3. The device as in claim 2 wherein the portion of the block having the hemispherical surface is formed by magnetic material; and
   the support structure includes a magnet which is in contact with said hemispherical surface.

4. The device as in claim 3 wherein the support structure further includes a support and the magnet frictionally contacts the support permitting the magnet to move against the support parallel to said axis.

5. The device as in claim 1 wherein the accelerometer comprises a piezoelectric transducer.

6. The device as in claim 5 wherein the accelerometer comprises:
   a first piece of thermally insulating material supported by the bracket;
   an electrically conductive thrust block having one surface in contact with and supported by the first insulating material, the thrust block having a second surface in contact with the piezoelectric transducer; and
   a second piece of thermally insulating material in contact with the piezoelectric transducer, the second insulating material supporting the mass.

7. The device as in claim 1 further comprising an object support extending between the object and the reference surface said support including a block of elastic material between the object and the reference surface.

8. A dynamic system for reducing the vibration of an object with respect to a reference surface, said system comprising a plurality of antivibration devices extending between the object and the reference surface, each such device including:
   a bracket attached to the object;
   an accelerometer coupled to the bracket;
   a mass supported by the accelerometer such that the accelerometer detects the acceleration of the mass along an axis; and
   means coupled between the bracket and the reference surface for generating forces along said axis to counter the detected acceleration of the mass, said means comprising an electromechanical transducer for generating counter forces in response to the output of the accelerometer and means for isolating the forces generated by the electromechanical transducer to only the force component along said axis.

9. The system as in claim 8 wherein there are at least six such antivibration devices providing reduction of vibration along each of three translational axes and each of three rotational axes.

10. The system as in claim 8 wherein the each antivibration device is mounted on the object so that the axis extends substantially either horizontally or vertically.

11. A dynamic antivibration device for reducing the vibration of an object with respect to a reference surface, said device comprising:
    a bracket attached to the object;
    a first piece of thermal insulating material supported by the bracket;
    an electrically conductive thrust block having one surface in contact with and supported by the first insulating material;
    a piezoelectric transducer in contact with another surface of said thrust block;
    a second piece of thermal insulating material supported by said transducer;
    a mass supported by said second piece of material; and
    means for generating forces to counter the acceleration forces of the mass, said means coupled between the bracket and the reference surface and responsive to an electrical signal from said piezoelectric transducer representing the acceleration of the mass along a given axis.

12. The device as in claim 11 wherein said means for generating forces comprises:
    an electromechanical transducer for generating counter forces in response to the signal from said piezoelectric transducer; and
    means for isolating the forces generated by the electromechanical transducer to only forces along said axis.

13. The device as in claim 12 wherein the means for isolating forces comprises:
    a block having a hemispherical surface, and block abutting the transducer with the hemispherical surface remote from the transducer; and
    a support structure on the reference surface and in contact with the hemispherical surface of said block.

* * * * *

UNITED STATES PATENT AND TRADEMARK OFFICE
CERTIFICATE OF CORRECTION

PATENT NO. : 4,615,504

DATED : October 7, 1986

INVENTOR(S): John Riddle Sandercock

It is certified that error appears in the above-identified patent and that said Letters Patent is hereby corrected as shown below:

Column 4, line 39, "given" should be --give--.

Column 8, line 56, "and" should be --said--.

Signed and Sealed this

Twenty-seventh Day of January, 1987

Attest:

DONALD J. QUIGG

*Attesting Officer*   *Commissioner of Patents and Trademarks*